United States Patent [19]  [11] 4,220,204
Hughes et al.  [45] Sep. 2, 1980

[54] OIL RECOVERY METHOD UTILIZING A DIALKYL PHENOL POLYETHOXY ALKYL SULFONATE AS A SOLUBILIZING CO-SURFACTANT

[75] Inventors: James W. Hughes, Missouri City; Mohan V. Kudchadker; Nancy G. Dunn, both of Houston, all of Tex.

[73] Assignee: Texaco Inc., White Plains, N.Y.

[21] Appl. No.: 31,261

[22] Filed: Apr. 18, 1979

[51] Int. Cl.² ............................................. E21B 43/22
[52] U.S. Cl. ............................. 166/274; 252/8.55 D
[58] Field of Search ...................... 166/273, 274, 279; 252/8.55 D

[56] References Cited

U.S. PATENT DOCUMENTS

| 3,500,919 | 3/1970 | Holm | 166/273 |
| 3,811,504 | 5/1974 | Flournoy et al. | 166/273 |
| 3,888,308 | 6/1975 | Gale et al. | 166/273 |
| 3,977,471 | 8/1976 | Gale et al. | 166/273 |
| 3,994,342 | 11/1976 | Healy et al. | 166/273 |
| 4,018,278 | 4/1977 | Shupe | 166/274 X |
| 4,059,154 | 11/1977 | Braden, Jr. et al. | 166/274 |
| 4,066,124 | 1/1978 | Carlin et al. | 166/273 X |
| 4,077,471 | 3/1978 | Shupe et al. | 166/275 |
| 4,088,189 | 5/1978 | Shupe | 166/275 X |
| 4,110,229 | 8/1978 | Carlin et al. | 166/273 X |

FOREIGN PATENT DOCUMENTS

| 958326 | 11/1974 | Canada | 166/273 |
| 1504789 | 3/1978 | United Kingdom | 166/275 |

Primary Examiner—Stephen J. Novosad
Assistant Examiner—George A. Suchfield
Attorney, Agent, or Firm—Carl G. Ries; Robert A. Kulason; Gregory A. Cone

[57] ABSTRACT

The dialkylbenzene polyethoxy alkyl sulfonate is combined with a water soluble petroleum sulfonate surfactant to form an effective surfactant solution that is stable in high salinity environments. The surfactant solution is injected into an underground petroleum reservoir in order to recover crude oil therefrom.

8 Claims, No Drawings

OIL RECOVERY METHOD UTILIZING A DIALKYL PHENOL POLYETHOXY ALKYL SULFONATE AS A SOLUBILIZING CO-SURFACTANT

BACKGROUND OF THE INVENTION

1. Field of the Invention

This invention relates to an oil recovery method which utilizes a surfactant solution comprising a water soluble petroleum sulfonate and a dialkylbenzene polyethoxy alkyl sulfonate as a solubilizing co-surfactant which is injected into an underground petroleum reservoir for the purpose of recovering crude oil therefrom.

2. DESCRIPTION OF THE PRIOR ART

The crude oil which has accumulated in subterranean reservoirs is recovered or produced through one or more wells drilled into the reservoir. In the initial production, the crude oil is produced by "primary recovery" techniques wherein only the natural forces present in the reservoir are utilized to produce the oil. However, upon depletion of these natural forces and the termination of primary recovery a large portion of the crude oil remains trapped within the reservoir. Additionally, many reservoirs lack sufficient natural forces to be produced by primary methods from the very beginning. Recognition of these facts has led to the development and use of many enhanced oil recovery techniques. Most of these techniques involve injection of at least one fluid into the reservoir to produce an additional amount of crude oil therefrom. Some of the more common methods are water flooding, stream flooding, immiscible flooding, $CO_2$ flooding, polymer flooding, surfactant flooding, caustic flooding, and in situ combustion.

Water flooding, which involves injection of water into the subterranean oil reservoir for the purpose of displacing the crude oil from the pore spaces of the reservoir rock toward the producing wells, is the most economical and widely used of the enhanced oil recovery methods. Nevertheless, water does not displace oil with high efficiency because of the immiscibility of water and oil and because of the high interfacial tension between them.

Surfactant flooding involves the addition of one or more surface active agents or surfactants to the water flood for the purpose of minimizing the water flooding problems mentioned above. This has been an area of active interest in the art of enhanced oil recovery methods for many years. For example, in 1941 U.S. Pat. No. 2,233,381 disclosed the use of polyglycol ether as a surfactant which increases the capillary displacement efficiency of an aqueous flood. U.S. Pat. No. 3,302,713 discloses the use of petroleum sulfonates as effective surfactants in oil recovery operations. Other surfactants proposed for use in oil recovery processes include alkyl sulfates, alkyl aryl sulfates, ethoxylated alkyl or alkyl aryl sulfates, alkyl sulfonates, alkyl aryl sulfonates, and quaternary ammonium salts.

While the above surfactants may be effective under ideal conditions, there are problems concerned with the use of each in most petroleum reservoirs. Some of the most serious problems arise from the effects of reservoir fluid salinity on the injected surfactant solution, the most common being precipitation and resultant loss of the surfactant. The petroleum sulfonates represent a class of surfactants that are relatively inexpensive and that are quite effective oil recovery agents under certain conditions. However, when used in single surfactant systems, they are best employed in reservoirs having brines of 10,000 ppm or less total dissolved solids salinity and a very low divalent ion concentration. Effectiveness of a petroleum sulfonate surfactant system can be extended somewhat by blending oil soluble petroleum sulfonates with water soluble petroleum sulfonates. However, even this solution is not entirely satisfactory because as the blended mixture is driven through the formation one of the components is often preferentially retained within the formation matrices, causing a change in the relative concentration of the surfactant components and resulting in a failure to maintain effective salinity tolerance as evidenced by precipitation of the surfactants.

It can be readily seen that there remains a substantial need for a surfactant flooding process that will allow the use of petroleum sulfonates in high salinity and high divalent ion concentration reservoir environments.

SUMMARY OF THE INVENTION

This invention involves an enhanced oil recovery process useful in reservoirs containing fluids having a salinity ranging from about 10,000–250,000 ppm total dissolved solids of which up to about 20,000 ppm are divalent ions. The process comprises mixing a water soluble petroleum sulfonate with an effective amount of a solubilizing cosurfactant which comprises a dialkylbenzene polyethoxy alkyl sulfonate. This surfactant mixture is then injected into and forced through the subterranean petroleum reservoir in order to recover petroleum therefrom.

DESCRIPTION OF THE PREFERRED EMBODIMENTS

The petroleum sulfonates are a class of surfactants that are relatively inexpensive but lack effectiveness in other than relatively benign reservoir fluid salinity environments. We have discovered that the addition of a dialkylbenzene polyethoxy alkyl sulfonate to a surfactant system which contains a water soluble petroleum sulfonate will produce a surfactant mixture that is effective in high salinity and high divalent ion reservoir fluid environments.

To better understand how the surfactant system of this invention achieves it high level effectiveness, it may be helpful to discuss the structure of surfactants in general, and the surfactants proposed herein in particular. Most conventional surfactants have an amphiphilic structure, that is, the molecules are composed of groups that have opposite solubility tendencies. For use in oil recovery operations, the surfactant should have at least one lipophilic or oil soluble group and at least one hydrophilic or water soluble group. Since the surface active properties of a surfactant are closely related to this oil-water solubility, the surfactant should exhibit a high degree of solubilization in both oil and water for effective oil recovery.

A solubilizing co-surfactant used in accordance with this invention can be formulated to exhibit the desired oil solubility for the surfactant system as a whole for use in high salinity brine and/or high temperature reservoirs environments. As explained in the following discussion this surfactant can be formulated by adjusting the relative size of the lipophilic portion of the surface active molecule.

Generally, the oil solubility of a surfactant is related to the molecular weight of the lipophilic portion of the molecule. In most cases, a surfactant's affinity for water increases faster than its affinity for oil. As the temperature increases, the ability to increase a surfactant's oil solubility can be very important. The solubilizing cosurfactant disclosed herein can be designed to take into account adverse temperature effects by varying the number of carbon atoms in the dialkyl groups to provide for a desired oil solubility for a particular reservoir temperature.

The hydrophilic portion of the solubilizing cosurfactant disclosed herein can also be adjusted to increase the surfactant system's water solubility. Typically, sulfonated surfactants tend to exhibit a relatively high degree of water solubility. However, they must rely on the sulfonate radical for their hydrophilicity. The surfactant solubility in brine will decrease as the water salinity increases. An ethoxy group positioned between the lipophilic group and the hydrophilic sulfonate group will increase the surfactant's solubility in water. Moreover, increasing the number of ethoxy groups will increase the surfactant's water solubility. Also, increasing the number of ethoxy groups will improve the surfactant's solubility in waters having high concentration of inorganic salts such as sodium chloride, magnesium chloride and calcium chloride.

The preferred size of the hydrophilic and lipophilic portions of the solubilizing co-surfactant of this invention will vary, depending on several considerations. For example, the chemico-physical characteristics of the formation in which the surfactant will be injected should be considered. For example, if the inorganic salt concentration is relatively low the average number of ethoxy groups may also be low. On the other hand, in high salinity environments the average number of ethoxy groups may be much higher. One skilled in the art can determine the particular combination of water soluble petroleum sulfonate and the solubilizing co-surfactant which will most effectively and efficiently recover oil from a particular formation.

A preferred solubilizing co-surfactant is described by the following formula:

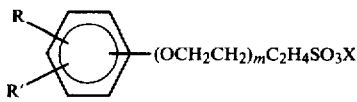

where R and R' are alkyl groups, m is a number from about 3 to about 15 and X is a cation.

The alkyl groups in the dialkyl portion of the above solubilizing co-surfactant may be linear or branched chain alkyl groups, preferably with from 6 to about 14 carbon atoms in each group. It is felt that it is this dialkyl formulation of the solubilizing co-surfactant that lends to it sufficient lipophilicity to effectively solubilize the companion petroleum sulfonate surfactant. Experiments with the monoalkyl form of the solubilizing co-surfactant, when combined with the water soluble sulfonate have failed to show any of the oil recovery characteristics such as low interfacial tension, high viscosity or good capillary displacement.

The following examples are presented as being illustrative of the effectiveness of the surfactant system disclosed in this invention but should, however, not be considered as limitative.

EXAMPLE I

Three separate tests were conducted on a surfactant system consisting of brine, a water soluble petroleum sulfonate, and a dialkylbenzene polyethoxy alkyl sulfonate. The brine contained 90,000 ppm total dissolved solids, which include 10,000 ppm divalent ion. The water soluble petroleum sulfonate was Witco Chemical Company's TRS 40 held at a concentration of 2.0% by weight. The dialkylbenzene polyethoxy alkyl sulfonate was added to the above components in varying amounts and is described by the following formula:

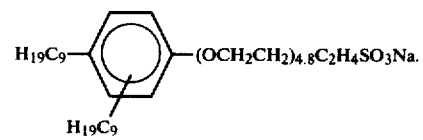

This mixture was then tested for capillary displacement viscocity and interfacial tension. The results are reported in Table 1:

TABLE 1

| Amount of Solubilizing Co-Surfactant | Capillary Displacement | (mm/20 min.) | Viscosity (cps) | Interfacial Tension (md/cm) |
|---|---|---|---|---|
| 0.35% | — | precipitation | — | — |
| 0.43 | — | precipitation | — | — |
| 0.52 | — | precipitation | — | — |
| 0.60 | 18.2 | | 4.56 | 19 |
| 0.69 | 20.0 | | 3.88 | 20 |
| 0.78 | 11.8 | | 4.74 | 20 |
| 0.86 | 5.6 | | 5.66 | 15 |
| 1.04 | 6.4 | | 6.02 | 15 |

EXAMPLE II

These tests were conducted on solutions containing the same brine and the same concentration of the identical water soluble petroleum sulfonate as in Example I, but with a slightly different solubilizing co-surfactant. The solubilizing co-surfactant used in this example is described by the following formula:

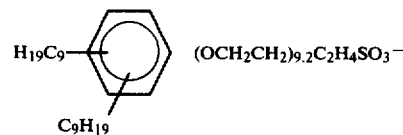

The surfactant solutions were tested for capillary displacement and viscosity. The results are reported in Table 2:

TABLE 2

| Amount of Solubilizing Co-Surfactant | Capillary Displacement | (mm/20 min.) | Viscosity (cps) |
|---|---|---|---|
| 0.4% | — | precipitation | — |
| 0.5 | 8.8 | | 2.22 |
| 0.7 | 12.8 | | 2.41 |
| 0.8 | 2.5 | | 2.98 |
| 0.9 | 0.1 | | 3.35 |
| 1.0 | 0.3 | | 3.00 |
| 1.1 | 0.0 | | 4.04 |
| 1.2 | 0.0 | | 2.74 |

EXAMPLE III

These tests were also conducted on a 2% solution of the Witco Chemical Company TRS 40 water soluble petroleum sulfonate mixed with the same brine as in Examples I and II above. However, the solubilizing co-surfactant here was a monoalkylbenzene polyethoxy alkyl sulfonate of the following formula:

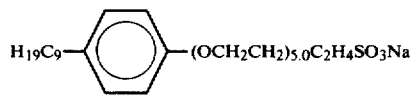

This solubilizing co-surfactant was again added in varying amount to the above solution and tested for capillary displacement, viscosity, and interfacial tension. The results are reported in Table 3 below, and demonstrate that the monoalkyl form of the solubilizing co-surfactant is ineffective in producing a stable and effective surfactant mixture in combination with a water soluble petroleum sulfate:

TABLE 3

| Amount of Solubilizing Co-Surfactant | Capillary Displacement (mm/20 min.) | Viscosity (cps) | Interfacial Tension (md/cm) |
|---|---|---|---|
| 0.35% | — | precipitation | — | — |
| 0.43 | — | precipitation | — | — |
| 0.52 | — | precipitation | — | — |
| 0.60 | — | precipitation | — | — |
| 0.69 | — | precipitation | — | — |
| 0.78 | — | precipitation | — | — |
| 0.86 | 0.5 | | 1.54 | 78 |
| 0.95 | 0.5 | | 1.50 | 98 |
| 1.04 | 0.5 | | 1.33 | 113 |

EXAMPLE IV

These tests were also conducted on the same brine as in the above examples, however, the water soluble petroleum sulfonate was a laboratory prepared species described as a WD-5 water soluble sulfonate with a 25% $SO_3$ treatment. A concentration of this laboratory prepared water soluble petroleum sulfonate was again held constant at 2.0%. The solubilizing co-surfactant used here was the same dialkyl form used in Example 1. Tests were again conducted for capillary displacement, viscosity and interfacial tension. The results are reported in Table 4:

TABLE 4

| Amount of Solubilizing Co-Surfactant | Capillary Displacement (mm/20 min.) | Viscosity (cps) | Interfacial Tension (md/cm) |
|---|---|---|---|
| 0.35% | — | precipitation | — | — |
| 0.43 | — | precipitation | — | — |
| 0.52 | — | precipitation | — | — |
| 0.60 | 6.2 | | 2.35 | * |
| 0.69 | 7.5 | | 3.40 | * |
| 0.78 | 3.2 | | 5.97 | 20 |
| 0.86 | 2.2 | | 8.85 | 13 |
| 0.95 | 1.9 | | 4.89 | 11 |
| 1.04 | 1.8 | | 4.61 | 12 |

*no data--solutions separated

The above examples demonstrate that addition of a dialkylbenzene polyethoxy alkyl sulfonate to a water soluble sulfonate surfactant mixture will extend the use of the water soluble sulfonate into high reservoir salinity environments. In order to perform effective as an oil recovery agent, a surfactant solution should display high capillary displacement values, high viscosity, and low interfacial tension as shown in the above examples. The addition of a dialkylbenzene polyethoxy alkyl sulfonate to a water soluble petroleum sulfonate produced a surfactant solution with the desired qualities.

For reservoirs containing brines at different salinities and at different temperatures, a different value for the number of moles of ethylene oxide contained in the solubilizing co-surfactant may be necessary. In many cases, it will be advantageous to add so-called "sacrificial agents". These are chemicals which are injected before or with a surfactant solution for the purpose of minimizing surfactant losses to reservoir matrix adsorption effects. Chemically modified ligno-sulfonates are often used for this purpose.

The surfactant solution is usually driven through the reservoir by an injection of a brine either with or without a thickening agent. Hydrophilic polymers are most commonly used as these thickening agents, with polyacrylamides and polysaccharides being used most often for this purpose. It is anticipated that the most efficient combination of surfactant concentration, slug size, polymer concentration, and type, as well as the use of other additives such as sacrificial agents will vary depending on the particular reservoir and conditions encountered. Generally, the surfactant slug will vary in volume from about 0.1 to about 5.0 pore volumes and the concentration of surfactant from about 1 to about 50 kg/m³.

The above examples have been presented for the purpose of illustration and should not be considered as limitative. Many other modifications and variations of the invention as hereinbefore set forth are possible and may be made without departing from the spirit and scope thereof, and only such limitations should be imposed as indicated in the following claims.

We claim:

1. A process for recovering petroleum from an underground petroleum reservoir penetrated by at least one injection means and at least one production means, said means being in fluid communication with each other, and containing a brine ranging in salinity from about 10,000 to about 200,000 ppm total dissolved solids including up to about 20,000 ppm divalent ions comprising:

a. injecting into the reservoir through said injection means a surfactant-containing fluid which comprises an effective amount of a water soluble petroleum sulfonate and a solubilizing cosurfactant which comprises a dialkylbenzene polyethoxy alkyl sulfonate of the formula:

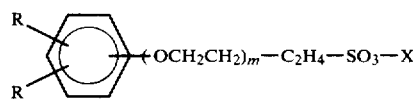

where R is an alkyl group containing from 6 to 14 carbon atoms, m is a number from 2 to 12 and X is a cation, b. forcing the surfactant-containing fluid through the reservoir and c. recovering petroleum from said production means.

2. The process of claim 1 wherein the concentration of the solubilizing co-surfactant ranges from about 0.05 percent to about 5.0 percent.

3. The process of claim 1 wherein the surfactant-containing fluid is forced through the reservoir by a fluid comprising an aqueous solution of a hydrophilic polymer wherein the polymer is present in a concentration sufficient to raise the viscosity of the forcing fluid to an effective level.

4. The process of claim 1 wherein the amount of the surfactant-containing fluid injected into the reservoir ranges from about 0.1 to about 5.0 pore volumes.

5. A process for recovering petroleum from an underground petroleum reservoir penetrated by at least one injection means and at least one production means, said means being in fluid communication with each other, and containing a brine ranging in salinity from about 10,000 to about 200,000 ppm total dissolved solids including up to about 20,000 ppm divalent ions comprising:

a. injecting into the reservoir through said injection means a surfactant-containing fluid which comprises an effective amount of a water soluble petroleum sulfonate and a solubilizing co-surfactant of the formula:

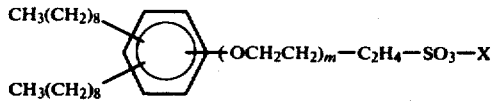

where m is a number from about 3 to about 10 and X is a sodium, potassium or ammonium ion, b. forcing the surfactant-containing fluid through the reservoir and c. recovering petroleum from said production means.

6. The process of claim 5 wherein the concentration of the solubilizing co-surfactant ranges from about 0.05 percent to about 5.0 percent.

7. The process of claim 5 wherein the surfactant-containing fluid is forced through the reservoir by a fluid comprising an aqueous solution of a hydrophilic polymer wherein the polymer is present in a concentration sufficient to raise the viscosity of the forcing fluid to an effective level.

8. The process of claim 5 wherein the amount of the surfactant-containing fluid injected into the reservoir ranges from about 0.1 to about 5.0 pore volumes.

* * * * *